(12) United States Patent
Tokunaga et al.

(10) Patent No.: US 7,665,392 B2
(45) Date of Patent: Feb. 23, 2010

(54) TIGHTENING TOOL

(75) Inventors: Manabu Tokunaga, Anjo (JP); Tomohiro Hachisuka, Anjo (JP)

(73) Assignee: Makita Corporation, Anjo-shi (JP)

( * ) Notice: Subject to any disclaimer, the term of this patent is extended or adjusted under 35 U.S.C. 154(b) by 375 days.

(21) Appl. No.: 11/700,120

(22) Filed: Jan. 31, 2007

(65) Prior Publication Data

US 2007/0180959 A1    Aug. 9, 2007

(30) Foreign Application Priority Data

Feb. 8, 2006   (JP) ............................. 2006-031427
Feb. 28, 2006  (JP) ............................. 2006-051640

(51) Int. Cl.
*B25B 23/157*  (2006.01)
*B23Q 5/00*    (2006.01)

(52) U.S. Cl. ....................................... 81/474; 173/178

(58) Field of Classification Search .................. 81/474, 81/467; 173/178, 2, 13, 213, 216; 192/69.8, 192/69.81, 31, 38
See application file for complete search history.

(56) References Cited

U.S. PATENT DOCUMENTS

| 4,088,197 | A | * | 5/1978 | Roll et al. ................ 173/178 |
| 4,655,103 | A | * | 4/1987 | Schreiber et al. ............. 81/474 |
| 4,883,130 | A | | 11/1989 | Dixon |
| 5,134,909 | A | * | 8/1992 | Sasaki ........................ 81/473 |
| 5,209,308 | A | * | 5/1993 | Sasaki ........................ 173/178 |
| 5,437,524 | A | * | 8/1995 | Huang ........................ 408/139 |
| 5,568,849 | A | * | 10/1996 | Sasaki et al. ................. 192/34 |
| 6,093,128 | A | * | 7/2000 | Seith ........................ 475/258 |
| 6,109,149 | A | * | 8/2000 | Neumaier .................... 81/469 |
| 7,188,557 | B2 | * | 3/2007 | Yamada ....................... 81/474 |
| 7,334,647 | B2 | * | 2/2008 | Hahn et al. .................. 173/178 |
| 7,422,075 | B2 | * | 9/2008 | Hahn ......................... 173/178 |
| 2006/0124331 | A1 | | 6/2006 | Stirm et al. |

FOREIGN PATENT DOCUMENTS

| JP | 50-33759 | 10/1975 |
| WO | WO 2004/024398 A1 | 3/2004 |

\* cited by examiner

*Primary Examiner*—David B Thomas
(74) *Attorney, Agent, or Firm*—Oliff & Berridge, PLC

(57) ABSTRACT

Tightening tools is provided with a pair of clutch members disposed between a motor and a tool bit. The pair of clutch members is provided with a first engaging portion and a second engaging portion. The first engaging portion is constructed so as to disengage the pair of clutch members when the torque applied to the tool bit is equal to or above a first predetermined value. The second engaging portion does not engage the pair of clutch members while the first engaging portion engages the pair of clutch members and the second engaging portion engages the pair of clutch members after the first engaging portion disengages the pair of clutch members. The second engaging portion is constructed so as to disengage the pair of clutch members when the torque applied to the tool bit is equal to or above a second predetermined value. The second predetermined value may be different from the first predetermined value.

11 Claims, 11 Drawing Sheets

TIGHTENING TOOL

CROSS-REFERENCE TO RELATED APPLICATIONS

This application claims priority to Japanese Patent Application No. 2006-031427 filed on Feb. 8, 2006 and Japanese Patent Application No. 2006-051640 filed on Feb. 28, 2006, the entire contents of which are hereby incorporated by reference.

BACKGROUND OF THE INVENTION

1. Field of the Invention

The present invention relates to tightening tools constructed to tighten a fastener such as a bolt, a nut, or a screw, and more particularly relates to tightening tools provided with a clutch that limits the torque transmitted from the motor to the tool bit.

2. Description of the Related Art

Publication of Japanese Examined Utility Model Application S50-33759 sets forth a tightening tool for tightening a fastener with a specified torque. This tightening tool comprises a clutch that limits the torque transmitted from the motor to the tool bit. The clutch comprises a pair of clutch members, and a spring member that pushes one of the clutch members towards the other. One clutch member of the pair is connected at a motor side, and the other clutch member of the pair is connected at a tool bit side. In this clutch, the torque is transmitted from the motor to the tool bit by means of mutually engaging the pair of clutch members, and the torque transmission from the motor to the tool bit is halted by disengaging the clutch members.

Engaging portions are formed on the pair of clutch members. The engaging portions are constructed so as to maintain engagement between the pair of clutch members while the torque applied to the tool bit (this is equivalent to the torque that the tool bit applies to the fastener) is less than a predetermined value, and are constructed so as to disengage the pair of clutch members when the torque applied to the tool bit reaches the predetermined value. The transmission of torque from the motor to the tool bit is consequently halted in this tightening tool at the point when the tightening torque of the fastener reaches the predetermined value.

The amount of torque required to cause disengagement of the clutch members varies according to the shape of the engaging portions and the pushing force applied by the spring member. Generally, the tightening tool is constructed in such a way that the pushing force applied from the spring member can be adjusted, and thus the torque that causes clutch members to disengage can be adjusted. The torque transmitted from the motor to the tool bit can thus be limited to the tightening torque specified for the fastener.

BRIEF SUMMARY OF THE INVENTION

The tightening tool receives a reactive force from the fastener while tightening the fastener. A user must hold the tightening tool while resisting the reactive force from the fastener. The reactive force received from the fastener increases rapidly between the time when the head portion of the fastener makes contact with a base material and the time when the tightening torque reaches a specified value. With the conventional tightening tool, the user must continue to hold the tightening tool with a large amount of force while resisting this rapidly increasing reactive force.

In addition to the aforementioned problem, in the case where the user has to tighten a plurality of fasteners each with differing tightening torques, the user must adjust the clutch each time he tightens a fastener. In order to adjust the clutch, the user needs to repeat the operations of adjusting the pushing force exerted by the spring member, and to verify this using a torque measuring machine. With a conventional tightening tool, the user can not tighten a plurality of fasteners with differing tightening torques without adjusting the tool clutch.

The present teachings provide techniques that can solve the aforementioned problems. The techniques derived from the present teachings enable the embodiment of an improved tightening tool with the aforementioned problems being reduced.

According to the present teachings, a tightening tool comprises a motor and a tool bit that can engage with a fastener such as a bolt, a nut, or a screw. In addition, the tightening tool comprises a pair of clutch members and a spring member. The pair of clutch members is disposed between the motor and the tool bit. The pair of clutch members can transmit a torque from the motor to the tool bit by being engaged, and can cease torque transmission by being disengaged. The spring member is constructed so as to push one of the clutch members towards the other.

The pair of the clutch members is provided with a plurality of engaging portions. Preferably, the plurality of engaging portions includes a first engaging portion and a second engaging portion. The first engaging portion is constructed so as to engage the pair of clutch members while the torque applied to the tool bit is less than a first predetermined value and to disengage the pair of clutch members when the torque applied to the tool bit is equal to or above the first predetermined value. The second engaging portion does not engage the pair of clutch members while the first engaging portion engages the pair of clutch members. The second engaging portion engages the pair of clutch members after the first engaging portion disengages the pair of clutch members. The second engaging portion is constructed so as to engage the pair of clutch members while the torque applied to the tool bit is less than a second predetermined value and to disengage the pair of clutch members when the torque applied to the tool bit is equal to or above the second predetermined value. The second predetermined value is different from the first predetermined value. The second predetermined value may be larger than the first predetermined value.

With this tightening tool, the engagement of clutch members by the first engaging portion is released when the torque applied to the tool bit from the fastener reaches the first predetermined value. At this time, the tightening torque of the fastener reaches the first predetermined value. After the pair of clutch members has been disengaged by the first engaging portion, the pair of clutch members is again engaged by the second engaging portion. Then, the pair of clutch members is again disengaged when the torque applied to the tool bit from the fastener reaches the second predetermined value.

With this tightening tool, the pair of clutch members is temporarily disengaged when the tightening torque reaches the first predetermined value. As a result, reactive force that the tightening tool receives from the fastener also falls temporarily when the first predetermined value is reached. If a user continues tightening this fastener, the pair of clutch members will be engaged again, and the tightening torque of the fastener increases to the second predetermined value. Although the reactive force that the tightening tool receives from the fastener also increases to the second predetermined value, the user is able to anticipate this increase. The user is able to continue holding the tightening tool without trouble.

In one aspect of the present teaching, the tightening tool may further include a motor controller. Preferably, the motor controller is constructed so as to keep driving the motor when the pair of clutch members is disengaged by the first engaging portion.

The rotation of the motor may be stopped when the pair of clutch members is disengaged by the second engaging portion. With this tightening tool, the user can easily tighten the fastener with the tightening torque of the second predetermined value.

When the tightening tool comprises a third engaging portion that disengage the pair of clutch members at a third predetermined value being larger than the second predetermined value, the motor may continue to rotate after the pair of clutch members is disengaged by the second engaging portion. With this tightening tool, the user can easily tighten the fastener with the tightening torque of the third predetermined value.

For ceasing driving the motor at the aforementioned time, it is preferable that the motor controller is further constructed so as to cease driving the motor when the pair of clutch members has been disengaged a predetermined number of times.

With this tightening tool, the motor may continue to rotate when the pair of clutch members is disengaged by the first engaging portion, and may stop rotation when the pair of clutch members is disengaged by the second engaging portion. When the tightening tool comprises a third engaging portion that is disengaged at a third predetermined value being larger than the second predetermined value, the motor may continue to rotate when the pair of clutch members is disengaged by the first engaging portion, may continue to rotate when the pair of clutch members is disengaged by the second engaging portion, and may stop rotation when the pair of clutch members is disengaged by the third engaging portion.

Alternatively, the user may cease tightening the fastener at the time when the engagement of the clutch members performed by the first engaging portion is released. The fastener can thus be tightened with the tightening torque of the first predetermined value. If a different fastener is tightened next, the different fastener can be tightened with the tightening torque of the second predetermined value. The user is thus able, without adjusting the clutch, to tighten a plurality of fasteners with differing tightening torques. In this case, the second predetermined value may be smaller or larger than the first predetermined value.

In one aspect of the present teachings, tightening tool may include a motor controller constructed so as to cease driving the motor whenever the pair of clutch members is disengaged.

With this tightening tool, the user can easily tighten one fastener with the tightening torque of the first predetermined value, and tighten another fastener with the tightening torque of the second predetermined value.

Optionally, the pair of clutch members is further provided with a third engaging portion. The third engaging portion is constructed so as to maintain engagement between the pair of clutch members when the torque applied to the tool bit is less than a third predetermined value, and is constructed so as to disengage the pair of clutch members when the torque applied to the tool bit is equal to or above the third predetermined value. Here, the third predetermined value may be larger than the second predetermined value. The pair of clutch members is preferably engaged by the third engaging portion after being disengaged by the second engaging portion.

In addition to the above, the tightening tools may include a motor controller. This motor controller is preferably adapted to keep driving the motor when the pair of clutch members are released from their engagement by either the second engaging portion or the third engaging portion, and adapted to cease driving the motor when the pair of clutch members is disengaged by the first engaging portion.

In another aspect of the present teachings, tightening tools may preferably include a motor controller constructed so as to cease driving the motor whenever the pair of clutch members is disengaged.

With this tightening tool, the user can easily tighten one fastener with the tightening torque of the first predetermined value, tighten another fastener with the tightening torque of the second predetermined value, and tighten further another fastener with the tightening torque of the third predetermined value.

Furthermore, the tightening tools may be provided with at least one indicator. The indicator(s) is/are constructed so as to function in a first manner when the pair of clutch members is disengaged by the first engaging portion, and constructed so as to function in a second manner when the pair of clutch members is disengaged by the second engaging portion.

With this tightening tool, the user can easily determine whether the fastener has been tightened with the tightening torque of the first predetermined value or with the tightening torque of the second predetermined value.

DETAILED DESCRIPTION OF THE INVENTION

Embodiment 1

First, important features of the first embodiment will be listed below.

(Feature 1) The tightening tool comprises a first clutch member and a second clutch member. The first clutch member is connected to a motor side, and the second clutch member is connected to a tool bit side.

(Feature 2) One of the first clutch member and the second clutch member is provided with a first engaging portion, a second engaging portion, and a third engaging portion. The other of the first clutch member and the second clutch member is provided with a contacting portion that makes contact with one of the first engaging portion, the second engaging portion, and the third engaging portion. The contacting portion makes contact with either the first engaging portion, the second engaging portion, or the third engaging portion according to a position of mutual rotation of the first clutch member and the second clutch member.

(Feature 3) The tightening tool comprises a means for detecting the disengagement of the pair of clutch members.

Figure 1:
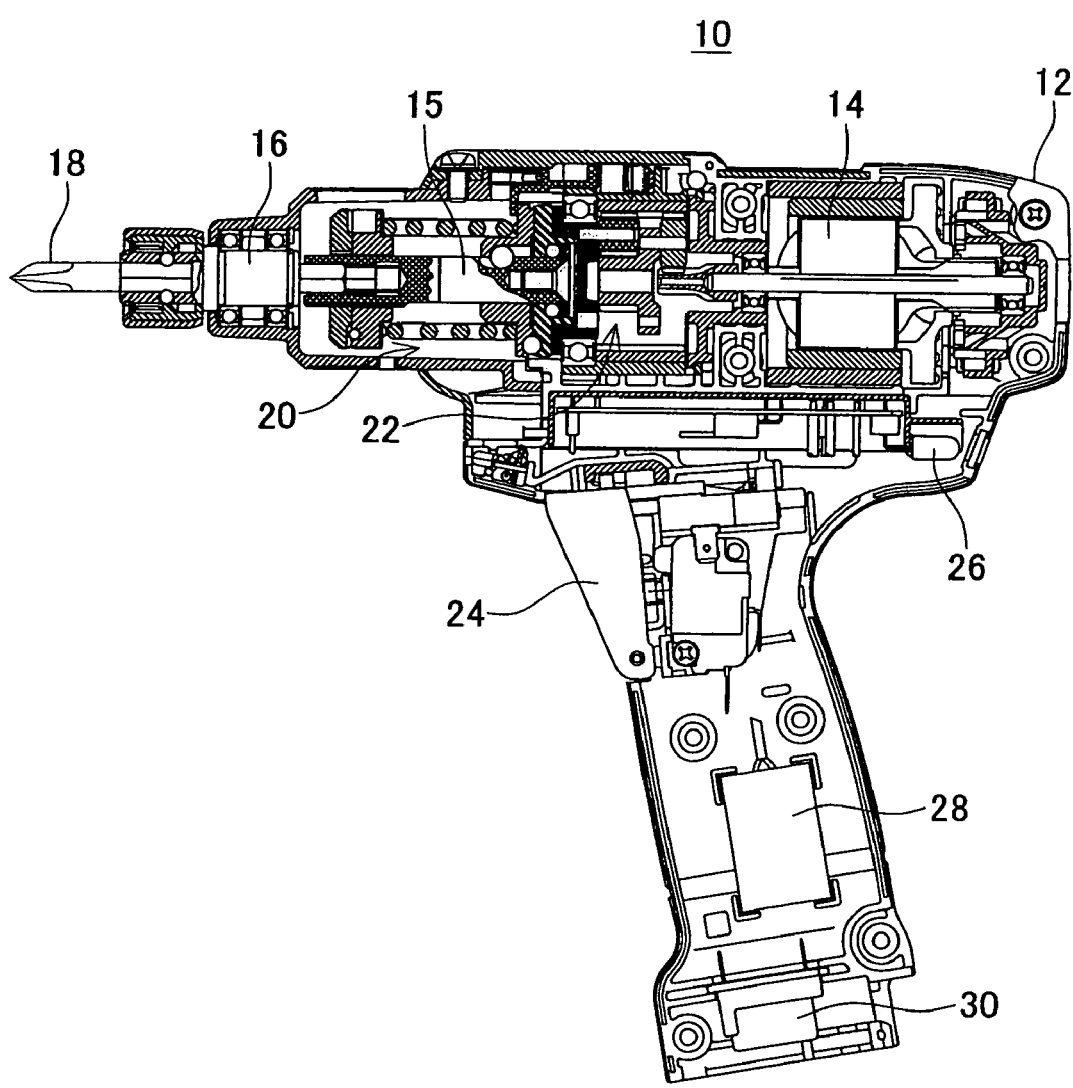
FIG. 1 shows the configuration of an electric screwdriver of a first embodiment.

FIG. 1 shows the internal configuration of an electric screwdriver 10 of the first embodiment. As shown in FIG. 1, the electric screwdriver 10 comprises a housing 12, a motor 14 housed within the housing, a tool chuck 16 supported rotatably on the housing 12, a spindle 15 supported rotatably on the housing 12, reduction gears 22, and a clutch 20. The reduction gears 22 and the clutch 20 transmit rotational torque of the motor 14 to the spindle 15. The tool chuck 16 is fixed to the spindle 15. The tool chuck 16 is configured such that a tool bit 18 that engages with a fastener (a bolt, nut, screw, etc.) can be attached thereto or removed therefrom. By causing the motor 14 to rotate, the electric screwdriver 10 rotates the tool bit 18 mounted in the tool chuck 16.

The electric screwdriver 10 comprises a trigger switch 24 operated by a user, an indicator light 26 provided so as to be visible to the user, the control circuit 28 for controlling the operation of the motor 14, the indicator light 26, etc., and a connector 30 for connecting a battery pack 100 (shown in FIG. 9) that constitutes a power source.

Figure 2:
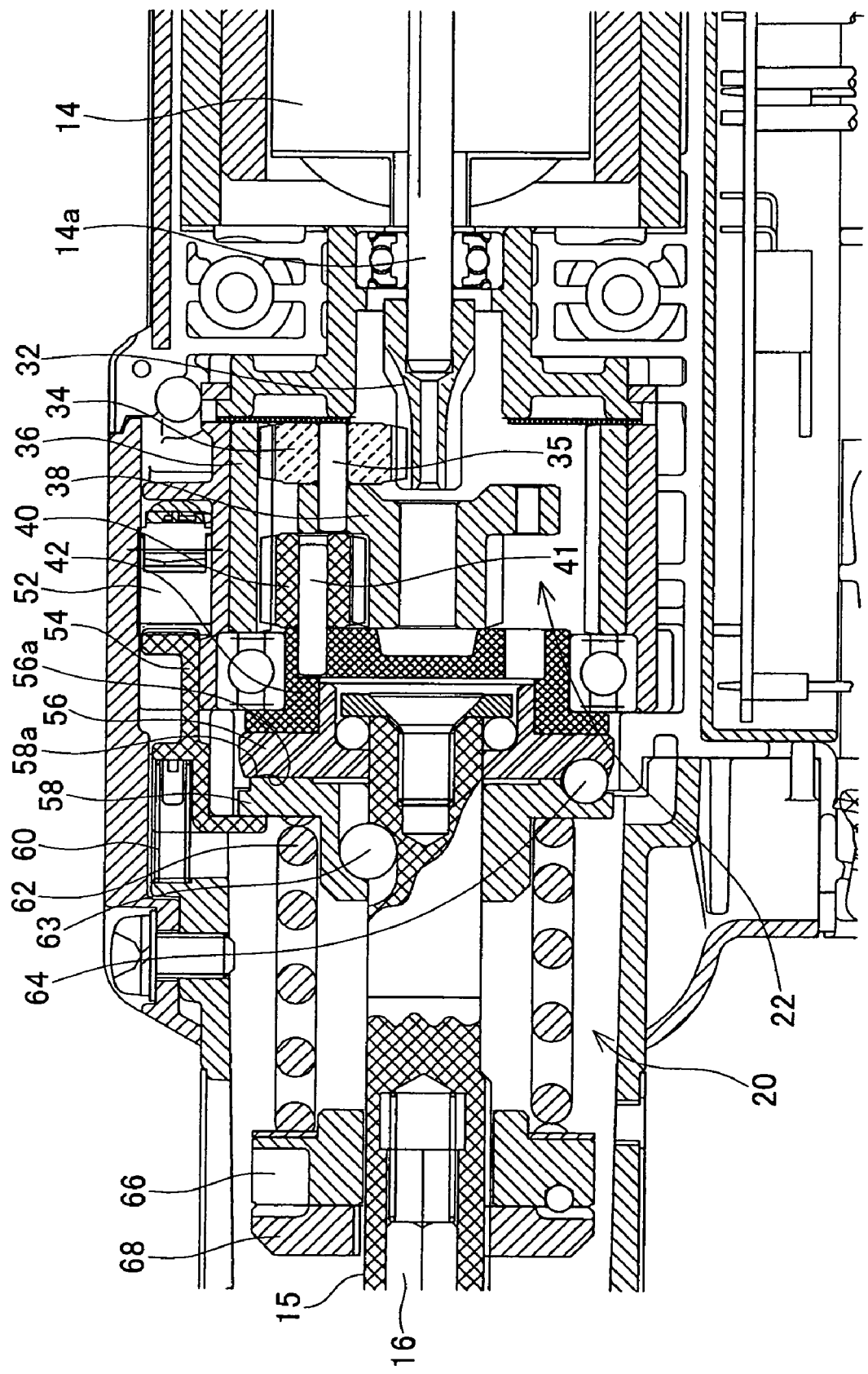
FIG. 2 shows an enlarged view of the internal configuration of the electric screwdriver of the first embodiment.

FIG. 2 shows an enlarged view of the internal configuration of the electric screwdriver 10. As shown in FIG. 2, the reduction gears 22 comprise a first sun gear 32, three first satellite gears 34 (partially omitted), an inner cog gear 36, a second sun gear 38, three second satellite gears 40 (partially omitted), and an output member 42. The first sun gear 32 is fixed to an output shaft 14a of the motor 14. The first satellite gears 34 mesh with both the first sun gear 32 and the inner cog gear 36, and revolve around the periphery of the first sun gear 32 while receiving the rotation of this first sun gear 32 and thus rotating. Rotary shafts 35 of the first satellite gears 34 are fixed to the second sun gear 38, and the second sun gear 38 rotates following the revolution of the first satellite gears 34. The second satellite gears 40 mesh with both the second sun gear 38 and the inner cog gear 36, and revolve around the periphery of the second sun gear 38 while receiving the rotation of this second sun gear 38 and thus rotating. Rotary shafts 41 of the second satellite gears 40 are fixed to the output member 42, and the output member 42 rotates following the revolution of the second satellite gears 40. The reduction gears 22 thus comprise a satellite gear structure formed in two steps, that reduces the rotational movement of the motor 14 at a predetermined reduction rate, and that outputs the reduced rotational movement to the output member 42. That is, the rotational torque of the output member 42, with respect to the rotational torque of the motor 14, is increased in amplitude at an inverse rate to the reduction rate.

The clutch 20 comprises a first clutch member 56, a second clutch member 58, three contacting spheres 64 (partially omitted), a compressing spring 62, three coupling spheres 63 (partially omitted), a spring retaining member 66, and an adjusting member 68.

The first clutch member 56 is fixed to the output member 42 of the reduction gears 22, and rotates, together with the output member 42, as the motor 14 rotates. The second clutch member 58 is provided on the spindle 15. The second clutch member 58 is coupled with the spindle 15 via the coupling spheres 63. The second clutch member 58 is not capable of rotating with respect to the spindle 15, and is capable of moving in the axial direction of the spindle 15.

A first opposing face 56a is formed on the first clutch member 56. A second opposing face 58a is formed on the second clutch member 58. The first opposing face 56a of the first clutch member 56 and the second opposing face 58a of the second clutch member 58 face one another. The contacting spheres 64 are interposed between the first opposing face 56a and the second opposing face 58a. The compressing spring 62 pushes the second clutch member 58 toward the first clutch member 56. The first clutch member 56 and the second clutch member 58 engage, via the contacting spheres 64, in the direction of rotation. When the first clutch member 56 and the second clutch member 58 engage, the torque from the motor 14 is transmitted to the spindle 15. Further, when the first clutch member 56 and the second clutch member 58 disengage, the torque transmission from the motor 14 to the spindle 15 ceases.

The spring retaining member 66 retains the end part of the compressing spring 62 that is at the opposite end from the second clutch member 58. The adjusting member 68 is screwed to a side face of the spindle 15, and moves in the axial direction of the spindle 15 by means of rotation. When the adjusting member 68 moves in the axial direction of the spindle 15, the spring retaining member 66 also moves in the axial direction of the spindle 15. By rotating the adjusting member 68, the user can adjust the pushing force with which the compressing spring 62 pushes the second clutch member 58 toward the first clutch member 56.

As shown in FIG. 2, the electric screwdriver 10 comprises a moving member 54 that moves together with the movement of the second clutch member 58, a detecting switch 52 that turns on and off together with the movement of the moving member 54, and a spring 60 that pushes the moving member 54 toward the detecting switch 52. When the second clutch member 58 moves toward the first clutch member 56, the moving member 54 receives the pushing force of the spring 60 and presses the detecting switch 52. At this juncture, the detecting switch 52 turns on. That is, the detecting switch 52 is "on" while the first clutch member 56 and the second clutch member 58 are engaged. When the second clutch member 58 moves away from the first clutch member 56, the moving member 54 also moves away from the detecting switch 52. At this juncture, the detecting switch 52 turns off. That is, the detecting switch 52 is "off" while the first clutch member 56 and the second clutch member 58 are disengaged.

Next, the first opposing face 56a of the first clutch member 56 and the second opposing face 58a of the second clutch member 58 will be described.

Figure 3:
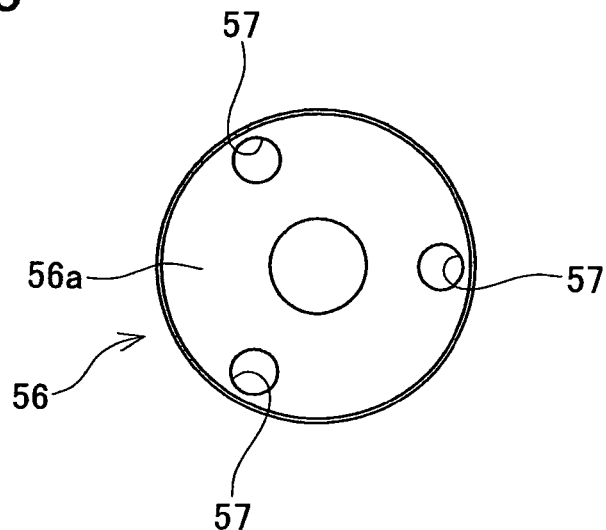
FIG. 3 shows a first clutch member of the first embodiment seen from a first opposing face side.

FIG. 3 shows the first clutch member 56 from the first opposing face 56a side. As shown in FIG. 3, three concave portions 57 for housing the contacting spheres 64 are formed on the first opposing face 56a of the first clutch member 56. The concave portions 57 are formed in a hemispherical shape. The three concave portions 57 are disposed equidistantly in a circumference direction. The contacting spheres 64 are held by the concave portions 57 of the first clutch member 56, and rotate together with the first clutch member 56. The contacting spheres 64 form a portion of the first clutch member 56. The first clutch member 56 and the contacting spheres 64 may be molded integrally.

Figure 4:
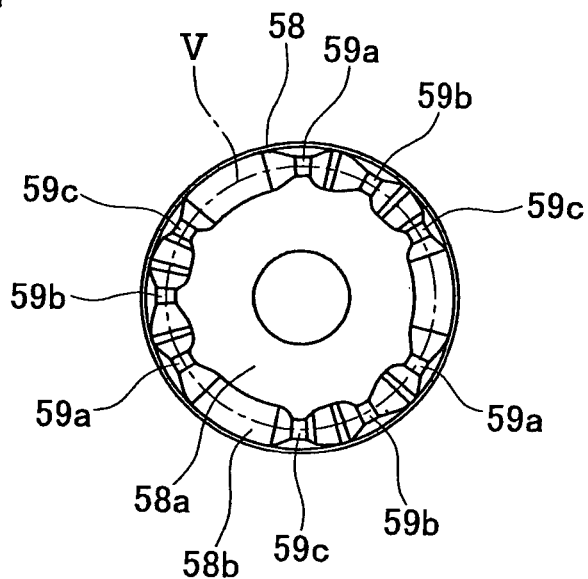
FIG. 4 shows a second clutch member of the first embodiment seen from a second opposing face side.
Figure 5:
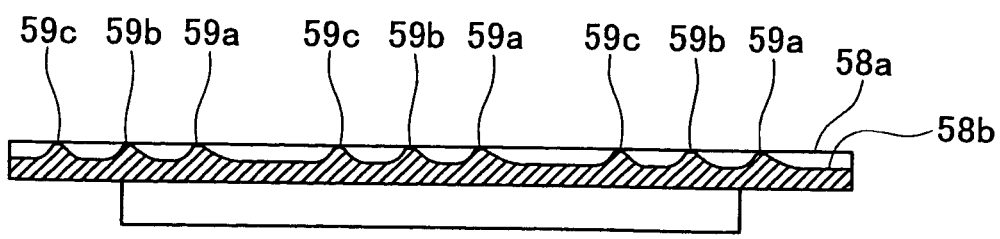
FIG. 5 shows an expanded cross-sectional view along the line V of FIG. 4.

FIG. 4 shows the second clutch member 58 from the second opposing face 58a side. FIG. 5 shows an expanded cross-sectional view along the circular sectional line V shown in FIG. 4. As shown in FIGS. 4 and 5, a groove portion 58b extending in the circumference direction is formed in the second opposing face 58a of the second clutch member 58. The groove portion 58b is formed in a position facing the concave portions 57 of the first clutch member 56. Three sets of engaging portions are formed in the groove portion 58b, each set of engaging portions having a first engaging portion 59a, a second engaging portion 59b, and a third engaging portions 59c. The three sets of engaging portions 59a, 59b, and 59c are disposed equidistantly along the circumference direction.

Figure 6:
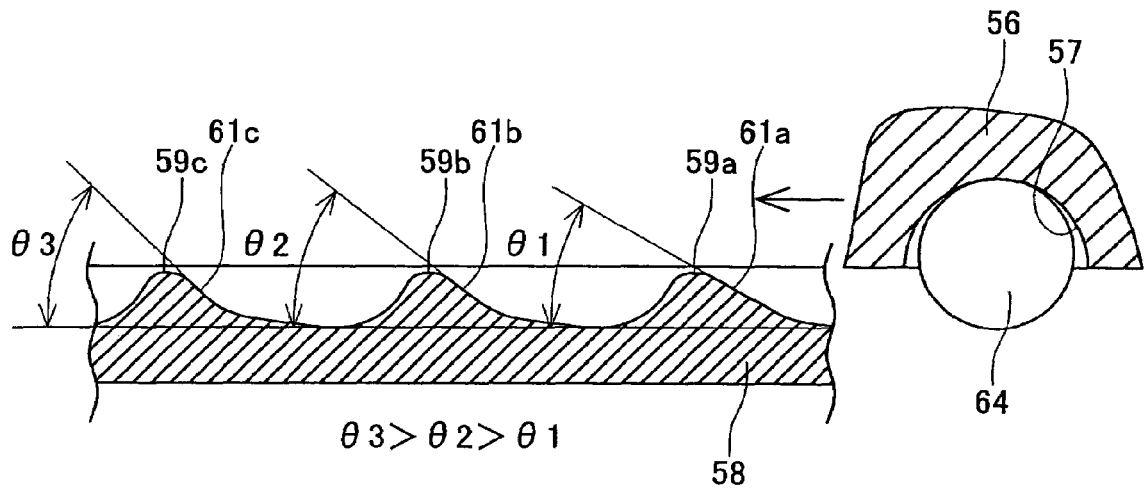
FIG. 6 shows an enlarged view of a set of engaging portions of the first embodiment.

FIG. 6 shows an enlarged view of one set of engaging portions 59a, 59b, and 59c. As shown in FIG. 6, the one set of engaging portions 59a, 59b, and 59c is disposed in the sequence: first engaging portion 59a, second engaging portion 59b, and third engaging portion 59c along the direction in which the first clutch member 56 rotates with respect to the second clutch-member 58.

Contacting gradient faces 61a, 61b, and 61c are formed respectively on the engaging portions 59a, 59b, and 59c. When the first clutch member 56 is rotated by the motor 14, the contacting spheres 64 that are maintained by the first clutch member 56 make contact with the contacting gradient faces 61a, 61b, and 61c. A gradient angle θ1 is formed at the first engaging portion 59a by the first contacting gradient face 61a. the gradient angle θ2 is formed at the second contacting gradient face 61b by the second engaging portion 59b. A gradient angle θ3 is formed at the third engaging portion 59c by the third contacting gradient face 61c. The gradient angles have the following size relationship: θ1<θ2<θ3.

Figure 7:
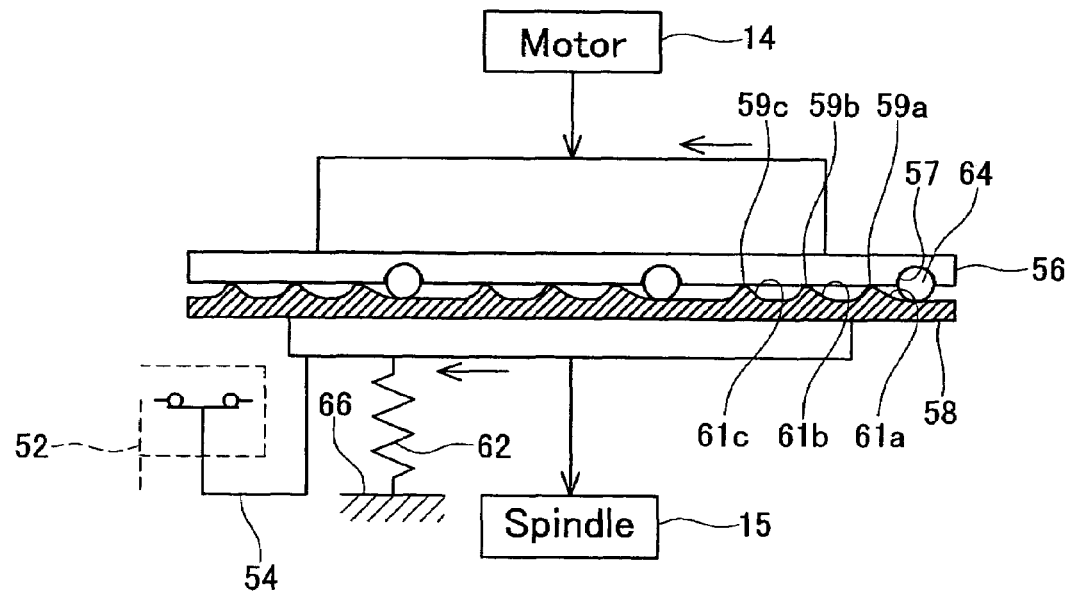
FIG. 7 shows the first clutch member and the second clutch member of the first embodiment in an engaged state.
Figure 8:
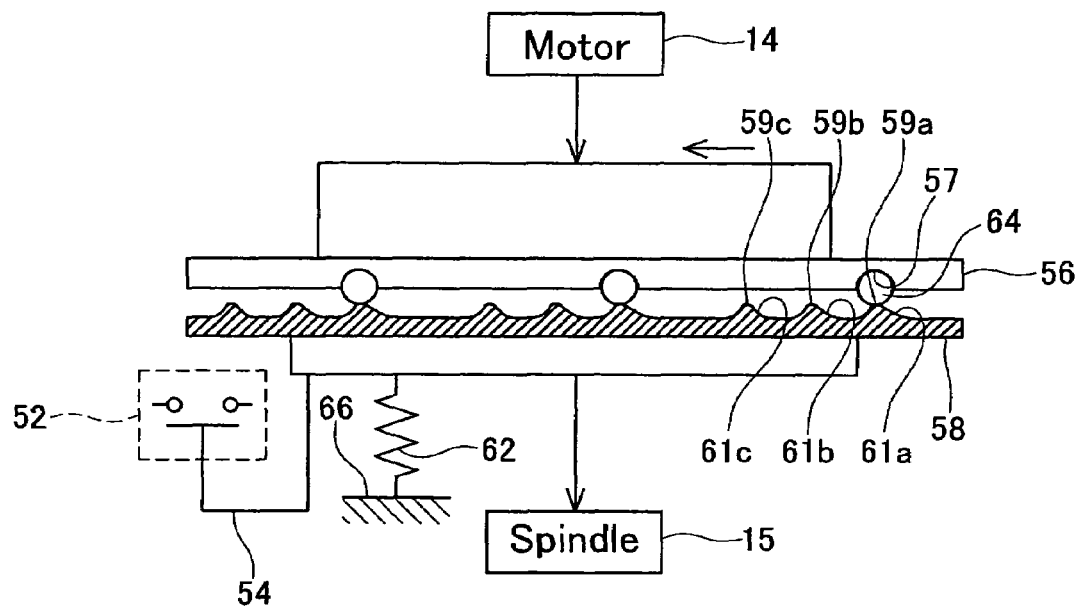
FIG. 8 shows the first clutch member and the second clutch member of the first embodiment in a disengaged state.

The operation of the clutch 20 will now be described with reference to FIGS. 7 and 8. FIGS. 7 and 8 are expanded views in the circumference direction of the first clutch member 56 and the second clutch member 58. As shown in FIG. 7, when the first clutch member 56 is rotated by the motor 14, the contacting spheres 64 maintained by the first clutch member 56 make contact with the first contacting gradient faces 61a of the first engaging portions 59a of the second clutch member 58. The contacting spheres 64 attempt to pass over the first engaging portions 59a, but are prevented from doing so by the pushing force of the compressing spring 62. The first clutch member 56 and the second clutch member 58 engage in the direction of rotation, and the two rotate integrally. The torque outputted from the motor 14 is thus transmitted to the spindle 15 via the clutch 20. At this juncture, the detecting switch 52 turns on.

As shown in FIG. 8, when the torque being applied to the spindle 15 increases, the compressing spring 62 is compressed, and the contacting spheres 64 pass over the first engaging portions 59c. At this juncture, the first clutch member 56 and the second clutch member 58 disengage, and the torque transmission from the motor 14 to the spindle 15 ceases. That is, in the case where a fastener has been tightened by the electric screwdriver 10, the torque transmission between the first clutch member 56 and the second clutch member 58 ceases at the time when the tightening torque reaches a first predetermined value R1. The first predetermined value R1 is mainly determined according to the pushing force of the compressing spring 62 and the gradient angle θ1 of the first contacting gradient faces 61a. The greater the angle θ1 of the first contacting gradient faces 61a, the greater the first predetermined value R1.

When the contacting spheres 64 pass over the first engaging portions 59a, the first clutch member 56 rotates with respect to the second clutch member 58, and the contacting spheres 64 make contact with the second contacting gradient faces 61b of the second engaging portions 59b. The first clutch member 56 and the second clutch member 58 thus re-engage. Then, the contacting spheres 64 pass over the second engaging portions 59b when the tightening torque applied to the fastener reaches a second predetermined value R2. The torque transmission between the first clutch member 56 and the second clutch member 58 is halted again by these contacting spheres 64 passing over the second engaging portions 59b. The second predetermined value R2 is mainly determined according to the pushing force of the compressing spring 62 and the gradient angle θ2 of the second contacting gradient faces 61b. Since the gradient angle θ2 of the second contacting gradient faces 61b is greater than the gradient angle θ1 of the first contacting gradient faces 61a, the second predetermined value R2 is greater than the first predetermined value R1.

When the contacting spheres 64 pass over the second engaging portions 59b, the first clutch member 56 rotates with respect to the second clutch member 58, and the contacting spheres 64 make contact with the third contacting gradient faces 61c of the third engaging portions 59c. The first clutch member 56 and the second clutch member 58 thus re-engage. Then, the contacting spheres 64 pass over the third engaging portions 59c when the tightening torque applied to the fastener reaches a third predetermined value R3. The torque transmission between the first clutch member 56 and the second clutch member 58 is halted again by these contacting spheres 64 passing over the third engaging portions 59c. The third predetermined value R3 is mainly determined according to the pushing force of the compressing spring 62 and the gradient angle θ3 of the third contacting gradient faces 61c. Since the gradient angle θ3 of the third contacting gradient faces 61c is greater than the gradient angle θ2 of the second contacting gradient faces 61b, the third predetermined value R3 is greater than the second predetermined value R2. That is, a relationship is formed wherein the third predetermined value R3>the second predetermined value R2>the first predetermined value R1.

The contacting spheres 64 again make contact with the first contacting gradient faces 61a of the first engaging portions 59a when the contacting spheres 64 have passed over the third engaging portions 59c, and the clutch 20 returns to the state shown in FIG. 7.

With the clutch 20, the torque transmission thus ceases temporarily when the tightening torque applied to the fastener reaches the first predetermined value R1. Then, the torque transmission again ceases temporarily when the tightening torque applied to the fastener reaches the second predetermined value R2. And then, the torque transmission again ceases temporarily when the tightening torque applied to the fastener reaches the third predetermined value R3. The clutch 20 halts the torque transmission three times until the tightening torque reaches the third predetermined value R3.

Figure 9:
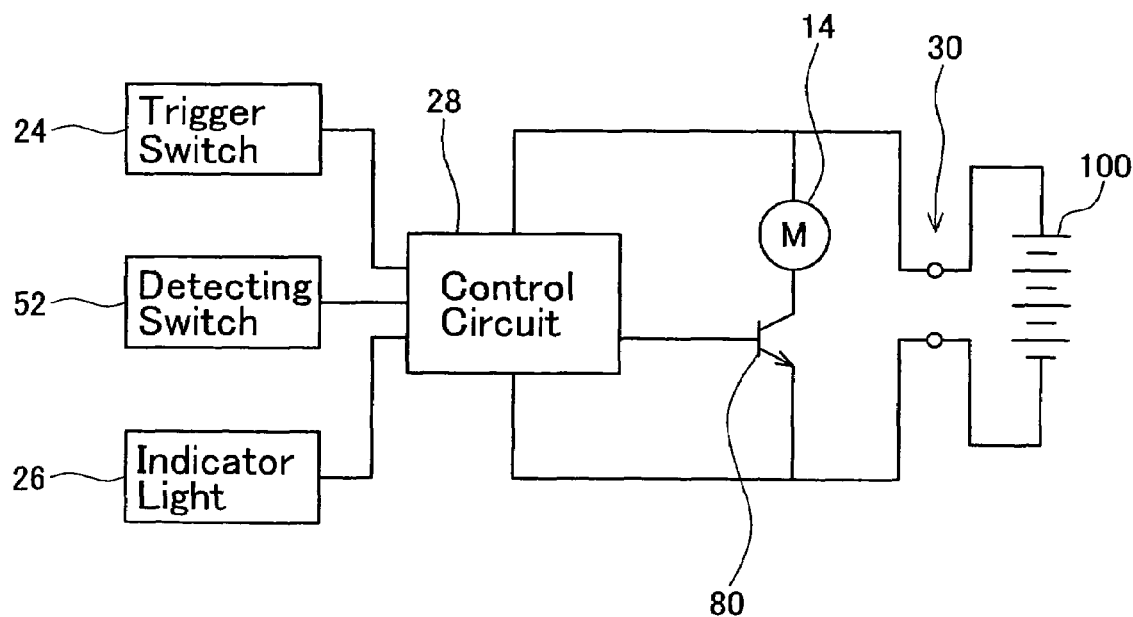
FIG. 9 shows the electrical configuration of the electric screwdriver of the first embodiment.

FIG. 9 schematically shows the circuit configuration of the electric screwdriver 10. With the electric screwdriver 10, as shown in FIG. 9, electric power is supplied to the motor 14 from the battery pack 100 connected with the connector 30, and electric power is supplied to the control circuit 28. A semiconductor switch 80 is interposed in the circuit connecting the connector 30 and the battery pack 100. The semiconductor switch 80 is turned on and off by driving signals outputted from the control circuit 28.

The control circuit 28 comprises a microcomputer, a constant potential power source circuit, etc. The trigger switch 24, the detecting switch 52, and the indicator light 26 are connected with the control circuit 28. The control circuit 28 controls the operation of the semiconductor switch 80 and the indicator light 26 based on output signals from the trigger switch 24 and the detecting switch 52.

Figure 10:
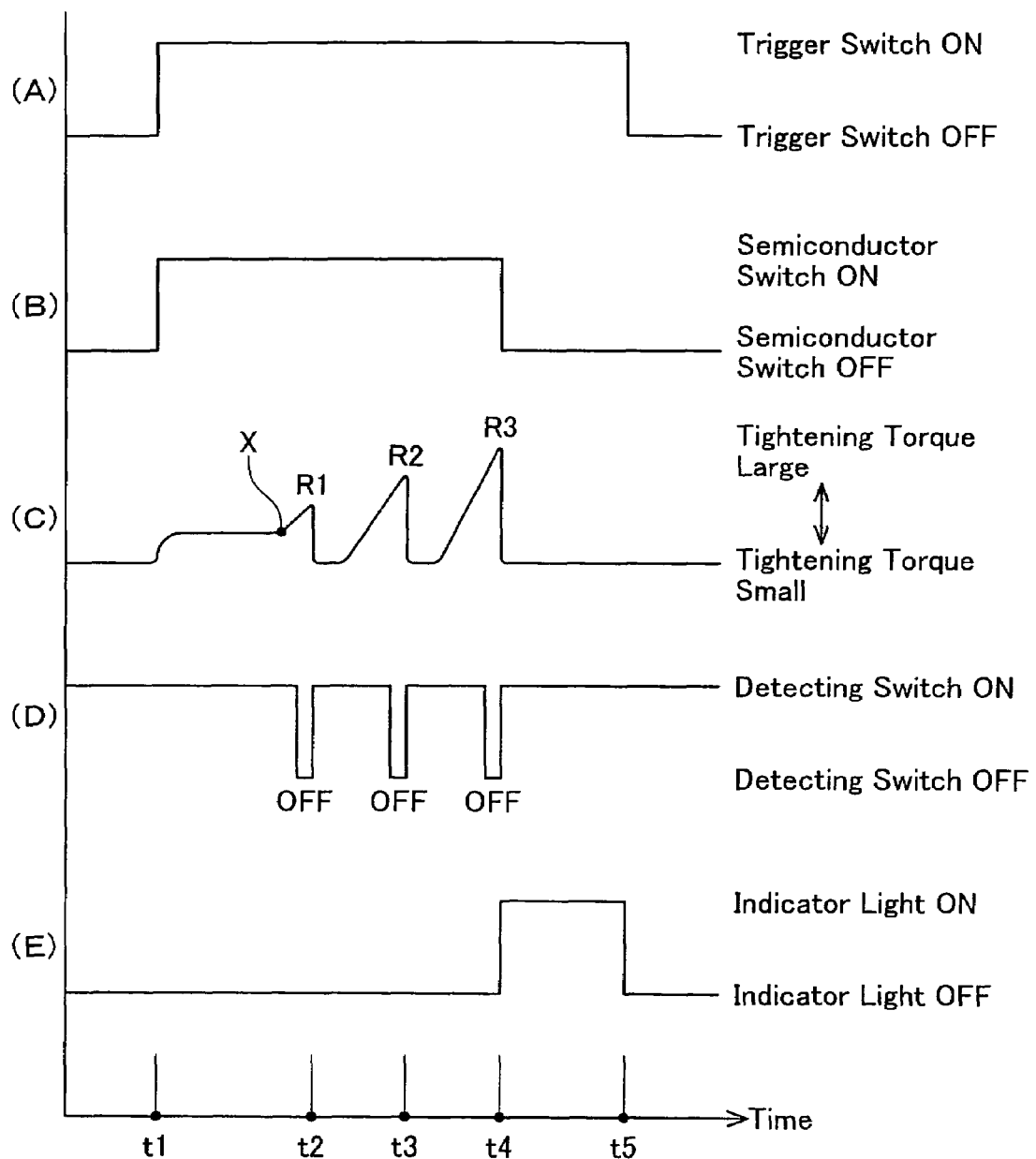
FIG. 10 shows a timing chart showing the flow of operations of the electric screwdriver of the first embodiment.

FIG. 10 shows a timing chart showing the operations, over time, of the electric screwdriver 10. The operation, etc. of the control circuit 28 will be described with reference to FIG. 10. In FIG. 10, (A) shows the on/off state of the trigger switch 24, (B) shows the on/off state of the semiconductor switch 80, and (C) shows reactive torque applied to the tool bit 18 from the fastener. This reactive torque is equivalent to the tightening torque applied to the fastener by the tool bit 18. (D) shows the on/off state of the detecting switch 52, and (E) shows the on/off state of the indicator light 26.

First, the user engages the tool bit 18 with the fastener, and turns the trigger switch 24 on. This point is time t1. When the trigger switch 24 is turned on at time t1, the control circuit 28 outputs a driving signal to the semiconductor switch 80. The semiconductor switch 80 is turned on. When the semiconductor switch 80 is turned on, the motor 14 is electrically connected to the battery pack 100, and begins rotation. In the clutch 20, the first clutch member 56 and the second clutch member 58 are engaged by the first engaging portions 59a. The torque from the motor 14 is transmitted to the spindle 15, and the tool bit 18 tightens the fastener. If the user turns the trigger switch 24 off, the control circuit 28 turns the semiconductor switch 80 off, and the driving of the motor 14 ceases. Here, the case that the user continues to maintain the trigger switch 24 on until a time ts (to be described) will be described.

As shown in FIG. 10 (C), reactive torque applied to the tool bit 18 from the fastener changes by a comparatively small value up until the time when a head portion of the fastener is seated. The reactive torque increases rapidly from the time when the head portion of the fastener is seated (X in the figure). When the reactive torque reaches the first predetermined value R3 at time t2, the contacting spheres 64 in the clutch 20 will pass over the first engaging portions 59a. When the reactive torque has reached the first predetermined value R1, the tightening torque of the fastener has also reached the first predetermined value R1. At this time t2, the first clutch member 56 and the second clutch member 58 temporarily disengage, and the reactive torque temporarily falls.

After the contacting spheres 64 have passed over the first engaging portions 59a, the contacting spheres 64 make contact with the second contacting gradient faces 61b of the second engaging portions 59b. The first clutch member 56 and the second clutch member 58 thus re-engage, and the torque output from the motor 14 is transmitted to the spindle 15.

As shown in FIG. 10 (C), the reactive torque applied to the tool bit 18 from the fastener reaches the second predetermined value R2 at time t3, whereupon the contacting spheres 64 in the clutch 20 pass over the second engaging portions 59b. When the reactive torque has reached the second predetermined value R2, the tightening torque of the fastener has also reached the second predetermined value R2. At this time t3, the first clutch member 56 and the second clutch member 58 temporarily disengage, and the reactive torque temporarily falls.

After the contacting spheres 64 have passed over the second engaging portions 59b, the contacting spheres 64 make contact with the third contacting gradient faces 61c of the third engaging portions 59c. The first clutch member 56 and the second clutch member 58 thus re-engage, and the torque output from the motor 14 is transmitted to the spindle 15.

As shown in FIG. 10 (C), the reactive torque applied to the tool bit 18 from the fastener reaches the third predetermined value R3 at time t4, whereupon the contacting spheres 64 in the clutch 20 pass over the third engaging portions 59c. When the reactive torque has reached the third predetermined value R3, the tightening torque of the fastener has also reached the third predetermined value R3. At this time t4, the first clutch member 56 and the second clutch member 58 temporarily disengage, and the reactive torque temporarily falls.

As described above, with the clutch 20, the torque transmission is repeatedly halted at time t2 when the tightening torque has reached the first predetermined value R1, at time t3 when the tightening torque has reached the second predetermined value R2, and at time t4 when the tightening torque has reached the third predetermined value R3. Although the reactive torque that the electric screwdriver 10 receives from the fastener increases rapidly from the time when the head portion of the fastener is seated, the reactive torque is first limited to the first predetermined value R1. The user is consequently able to continue holding the electric screwdriver 10 without trouble. Next, the reactive force that the electric screwdriver 10 receives from the fastener increases to the second predetermined value R2. Since the user is able to anticipate this increase, he is able to continue holding the electric screwdriver 10 without trouble. Next, the reactive force that the electric screwdriver 10 receives from the fastener increases to the third predetermined value R3 that is greater than the second predetermined value R2. Since the user is able to anticipate this increase, he is able to continue holding the tightening tool without trouble. The user can easily tighten the fastener with the tightening torque of the third predetermined value R3.

As shown in FIG. 10 (D), the detecting switch 52 has been turned off three times when the tightening torque reaches the third predetermined value R3. First, the first clutch member 56 and the second clutch member 58 are disengaged by the first engaging portions 59a, and the detecting switch 52 is turned off for the first time (time t2). Then the first clutch member 56 and the second clutch member 58 are disengaged by the second engaging portions 59b, and the detecting switch 52 is turned off for the second time (time t3). Next, the first clutch member 56 and the second clutch member 58 are disengaged by the third engaging portions 59c, and the detecting switch 52 is turned off for the third time (time t4).

The control circuit 28 counts the number of times the detecting switch 52 is turned off. When the detecting switch 52 has been turned off three times, the control circuit 28 turns the semiconductor switch 80 off as shown in FIG. 10 (B), and turns the indicator light 26 on as shown in FIG. 10 (E). The control circuit 28 thus halts the driving of the motor 14 and informs the user that the tightening torque of the fastener has reached the third predetermined value R3. When the user has noted that the indicator light 26 has lit up, he turns the trigger switch 24 off (time t5). When the trigger switch 24 has been turned off, the control circuit 28 turns the indicator light 26 off. The user can thus finish tightening the fastener as described above. The fastener has been tightened with the tightening torque of the third predetermined value R3.

The number of which the control circuit 28 counts, for determining that the fastener has completely tightened, corresponds to the number of engaging portions that constitute one set of engaging portions. Such engaging portions correspond to the three engaging portions 59a, 59b, and 59c in this embodiment. In the case where, for example, the set of engaging portions constitutes of only two engaging portions, the control circuit 28 will determine that the fastener has been completely tightened when the detecting switch 52 has been turned off two times.

A first embodiment of the present invention has been described in detail above. However, the above is merely an example, and does not restrict the scope of the claims. The art set forth in the claims encompasses various transformations and modifications to the embodiment described above.

The detecting switch 52 may equally well be configured so as to respond only when the contacting spheres 64 have passed over the third engaging portions 59c. In this case, the control circuit 28 can determine that the fastener has been completely tightened whenever the detecting switch 52 is turned off. For this purpose, the third engaging portions 59c may, for example, be formed so as to be taller than the other engaging portions 59b and 59c.

The configuration of the first opposing face 56a of the first clutch member 56 and the configuration of the second opposing face 58a of the second clutch member 58 may equally well be the inverse of the above embodiment. That is, the engaging portions 59a, 59b and 59c may be formed on the first clutch member 56, and the contacting spheres 64 may be maintained on the second clutch member 58. In this case, the contacting spheres 64 and the second clutch member 58 may be molded integrally.

The third engaging portions 59c need not necessarily be provided. Only the first engaging portions 59a and the second engaging portions 59b may be provided.

The control circuit 28 may be configured so as to turn the semiconductor switch 80 off whenever the detecting switch 52 is turned off. In this case, driving the motor 14 is stopped whenever the pair of clutch members 56, 58 is disengaged. This tightening tool may be used in a similar way as the second embodiment described below.

Embodiment 2

First, important feature of the second embodiment will be listed below.

(Feature 4) The tightening tool comprises a first indicator light that lights up when the pair of clutch members have been disengaged by the first engaging portion, a second indicator light that lights up when the pair of clutch members have been disengaged by the second engaging portion, and a third indicator light that lights up when the pair of clutch members have been disengaged by the third engaging portion.

Figure 11:
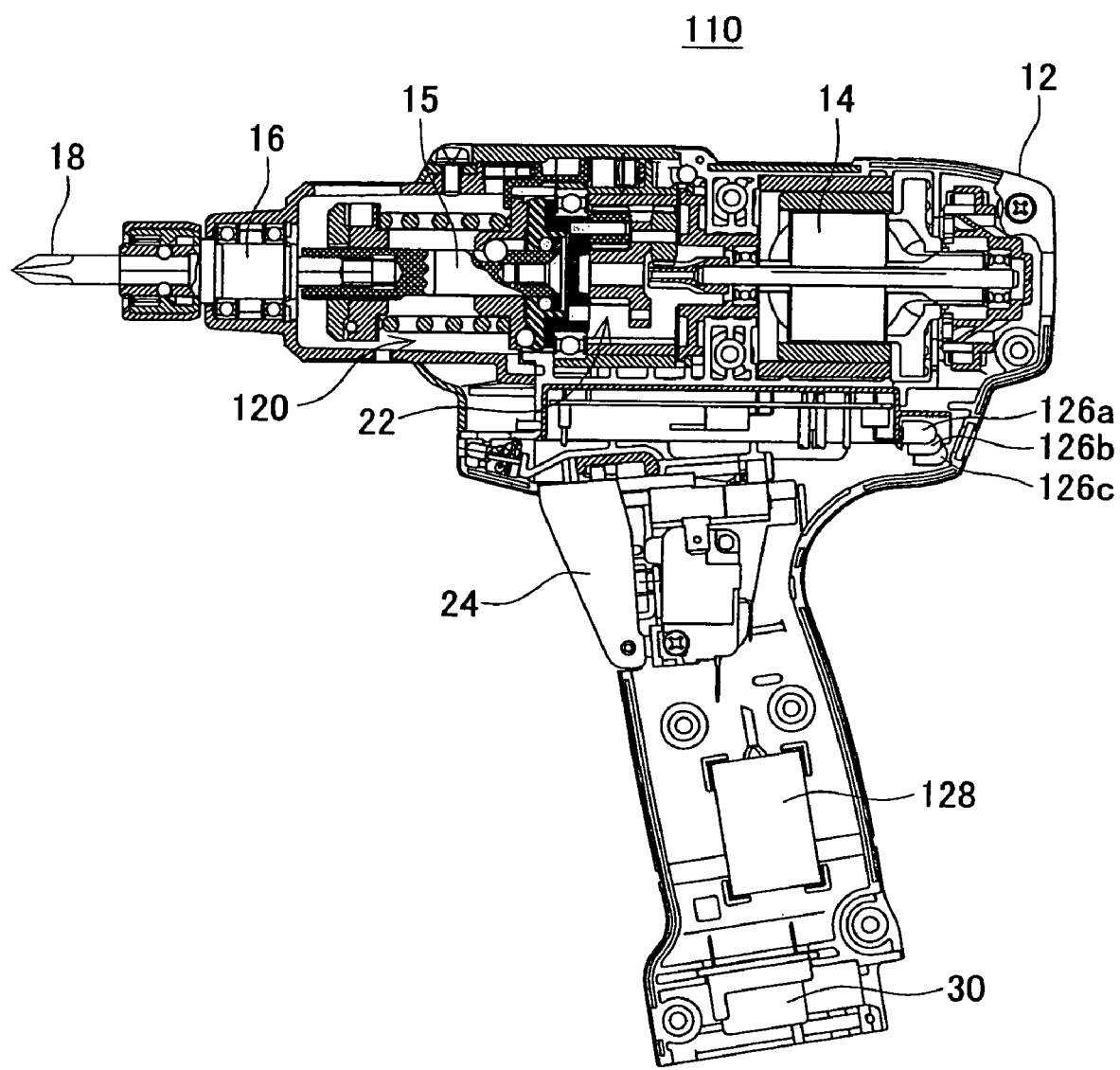
FIG. 11 shows the configuration of an electric screwdriver of a second embodiment.

FIG. 11 shows the internal configuration of an electric screwdriver 110 of the second embodiment. The electric screwdriver 110 of the second embodiment contains many configurational aspects that are the same in the electric screwdriver 10 of the first embodiment. The configurational aspects that are the same as in the first embodiment have the same numbers applied thereto, and a description thereof is omitted.

As shown in FIG. 11, the electric screwdriver 110 comprises a housing 12, a motor 14, a tool chuck 16, a spindle 15, reduction gears 22, and a clutch 120.

The electric screwdriver 110 comprises a trigger switch 24, a first indicator light 126a, a second indicator light 126b, and a third indicator light 126c all provided so as to be visible to the user, a control circuit 128, and a connector 30.

Figure 12:
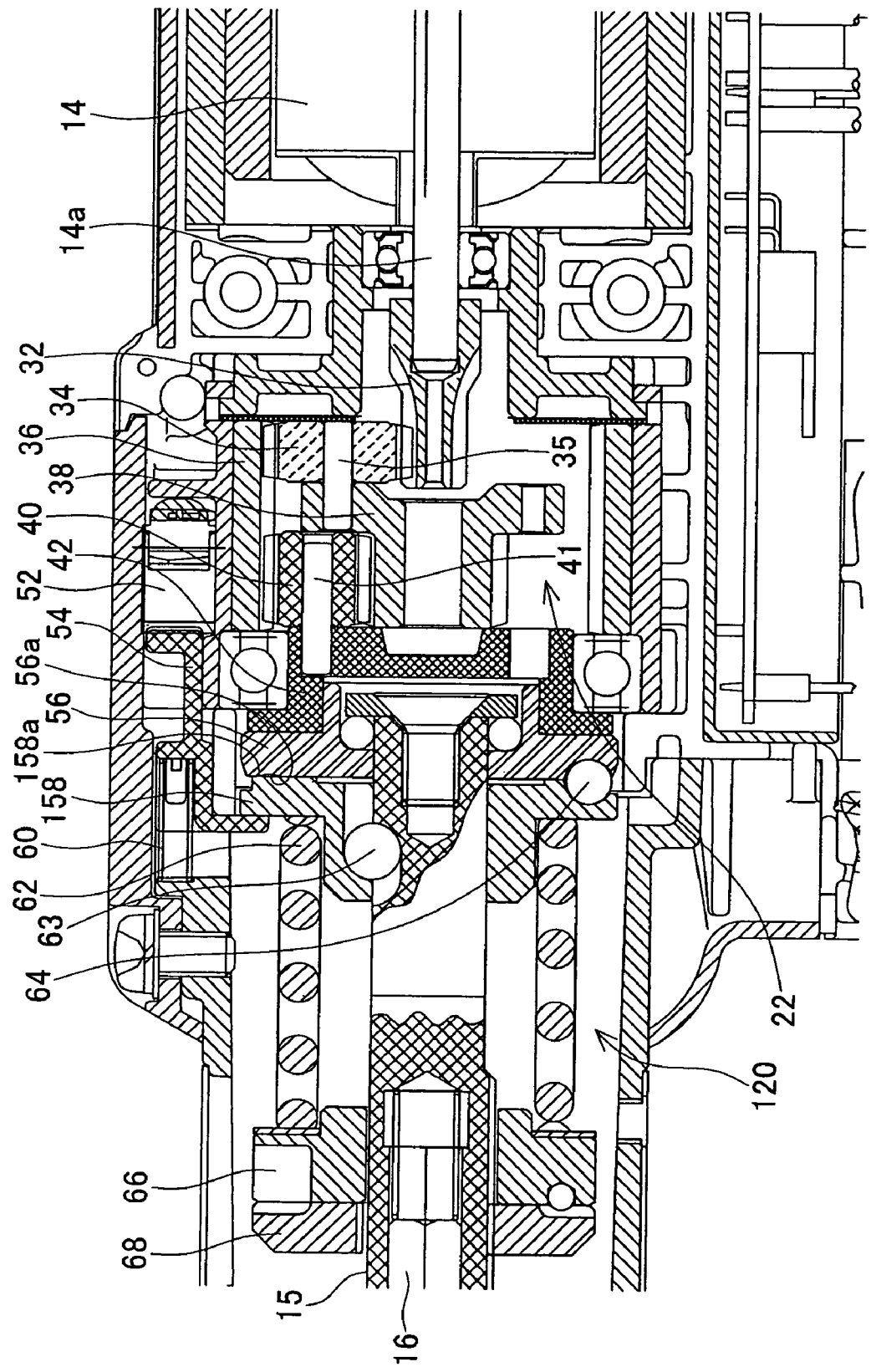
FIG. 12 shows an enlarged view of the internal configuration of the electric screwdriver of the second embodiment.

FIG. 12 shows the internal configuration of the electric screwdriver 110. The configuration of the reduction gears 22 is the same as described in the first embodiment.

The clutch 120 comprises a first clutch member 56, a second clutch member 158, three contacting spheres 64 (partially omitted), a compressing spring 62, three coupling spheres 63 (partially omitted), a spring retaining member 66, and an adjusting member 68. A first opposing face 56a is formed on the first clutch member 56. A second opposing face 158a is formed on the second clutch member 158. The clutch 20 of the first embodiment and the clutch 120 of the second embodiment differ in the configuration of the second clutch members 58 and 158.

The electric screwdriver 110 comprises a moving member 54, a detecting switch 52, and a spring 60. The configuration and functions of these components is the same as described in the first embodiment.

Figure 13:
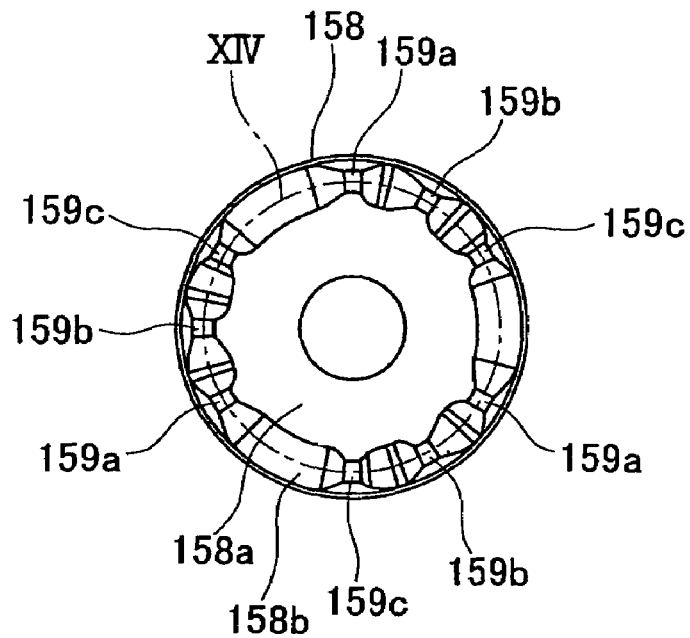
FIG. 13 shows a second clutch member of the second embodiment seen from a second opposing face side.
Figure 14:
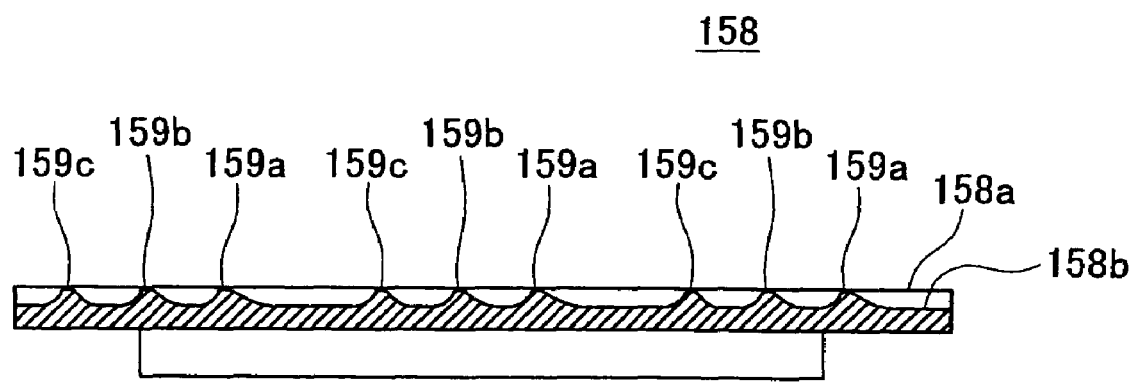
FIG. 14 shows an expanded cross-sectional view along the line XIV of FIG. 13.

The second clutch member 158 of the second embodiment will now be described. FIG. 13 shows the second clutch member 158 from the second opposing face 158a side. FIG. 14 shows an expanded cross-sectional view along the circular sectional line XIV shown in FIG. 13. As shown in FIGS. 13 and 14, a groove portion 158b extending in the circumference direction is formed in the second opposing face 158a of the second clutch member 158. The groove portion 158b is formed in a position facing concave portions 57 of the first clutch member 56. Three sets of engaging portions are formed in the groove portion 158b, each set of engaging portion having first engaging portions 159a, second engaging portions 159b, and third engaging portions 159c. The three sets of engaging portions 159a, 159b, and 159c are disposed equidistantly in the circumference direction.

Figure 15:
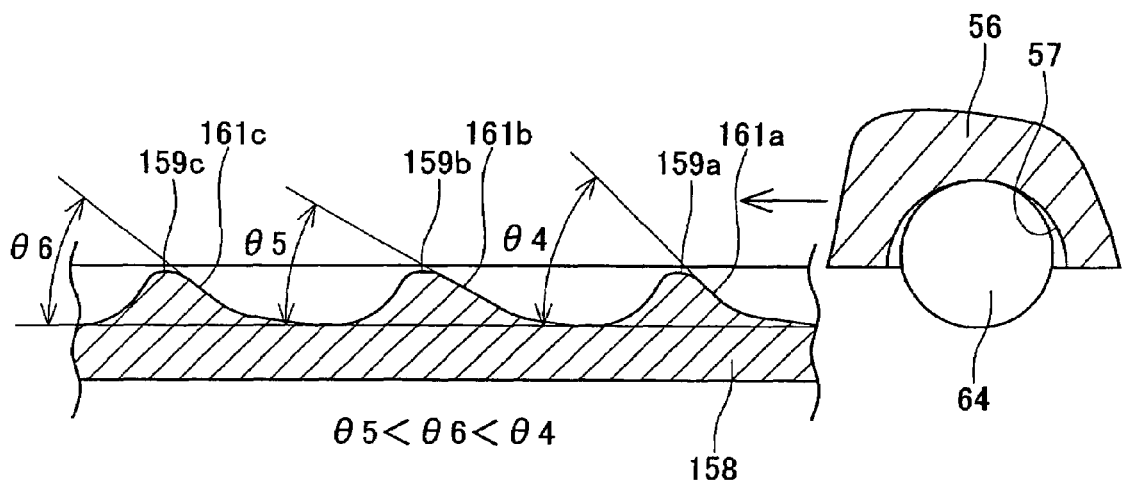
FIG. 15 shows an enlarged view of a set of engaging portions of the second embodiment.

FIG. 15 shows an enlarged view of one set of engaging portions 159a, 159b, and 159c. As shown in FIG. 15, the one set of engaging portions 159a, 159b, and 159c is disposed in the sequence: The third engaging portion 159c, The second engaging portion 159b, and The first engaging portion 159a along the direction in which the first clutch member 56 rotates with respect to the second clutch member 158.

Contacting gradient faces 161a, 161b, and 161c are formed respectively on the Engaging portions 159a, 159b, and 159c. A gradient angle $\theta 4$ is formed at the first engaging portion 159a by the first contacting gradient face 161a. A gradient angle $\theta 5$ is formed at the second contacting gradient face 161b by the second engaging portion 159b. A gradient angle $\theta 6$ is formed at the third engaging portion 159c by the third contacting gradient face 161c. The gradient angles $\theta 4$, $\theta 5$, and $\theta 6$ have the following size relationship: $\theta 5 < \theta 4 < \theta 6$.

The operation of the clutch 120 is the same as that of the clutch 20 of the first embodiment (see FIGS. 7 and 8). After the first clutch member 56 and the second clutch member 158 have been disengaged by the first engaging portions 159a, the first clutch member 56 and the second clutch member 158 are engaged by the second engaging portions 159b. After the first clutch member 56 and the second clutch member 158 have been disengaged by the second engaging portions 159b, the first clutch member 56 and the second clutch member 158 are engaged by the third engaging portions 159c. After the first clutch member 56 and the second clutch member 158 have been disengaged by the third engaging portions 159c, the first clutch member 56 and the second clutch member 158 are re-engaged by the first engaging portions 159a.

In the case where the first clutch member 56 and the second clutch member 158 are engaged by the first engaging portions 159a, the first clutch member 56 and the second clutch member 158 are disengaged at the time when the tightening torque applied to the fastener reaches a first predetermined value R4

(may be different from the first predetermined value R1 in the first embodiment). In the case where the first clutch member 56 and the second clutch member 158 are engaged by the second engaging portions 159b, the first clutch member 56 and the second clutch member 158 are disengaged at the time when the tightening torque applied to the fastener reaches a second predetermined value R5 (may be different from the second predetermined value R2 in the first embodiment). In the case where the first clutch member 56 and the second clutch member 158 are engaged by the third engaging portions 159c, the first clutch member 56 and the second clutch member 158 are disengaged at the time when the tightening torque applied to the fastener reaches a third predetermined value R6 (may be different from the third predetermined value R3 in the first embodiment). Based on the size relationship of the gradient angles θ4, θ5, and θ6, the second predetermined value R5<the third predetermined value R6<the first predetermined value R4.

In the electric screwdriver 110 of the second embodiment, the amount of torque required to cause disengagement of the clutch members 56, 158 can change in order of the first predetermined value R4, the second predetermined value R5, the third predetermined value R6, and again the first predetermined value R4 . . . without operating the adjusting member 68 to adjust the pushing force of the compressing spring 62.

Figure 16:
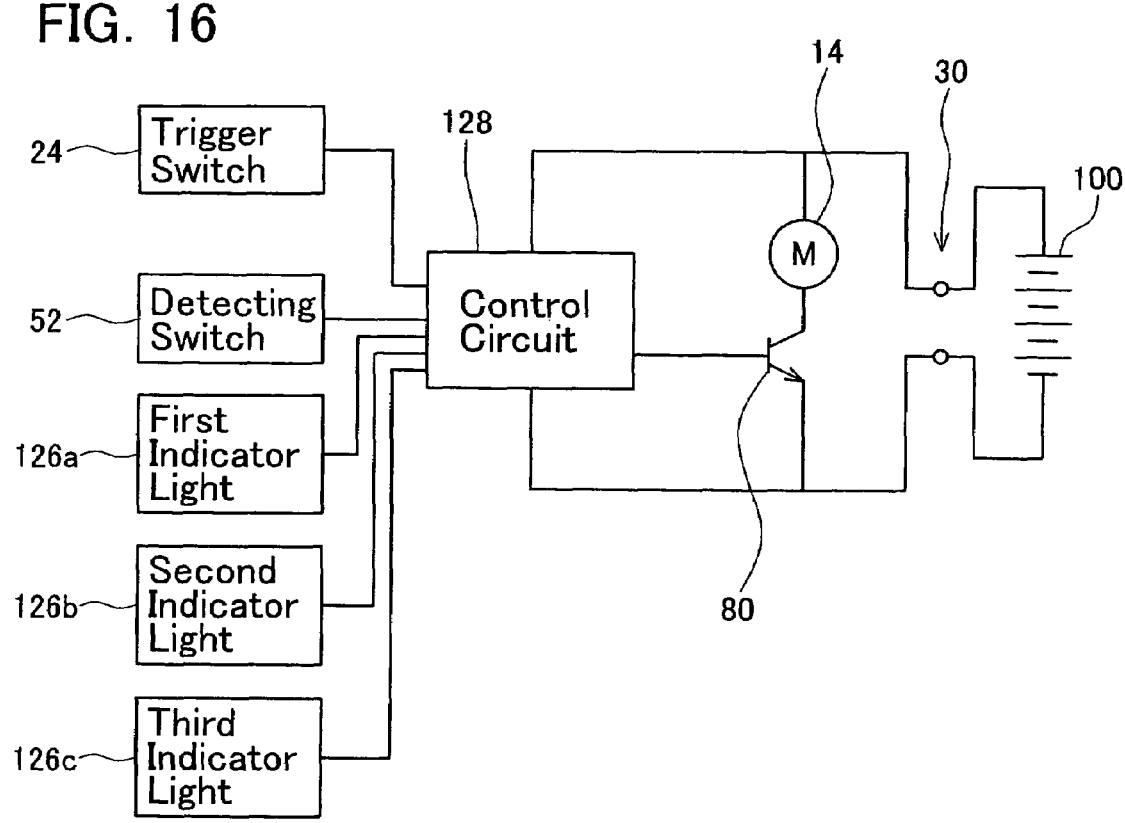
FIG. 16 schematically shows the electrical configuration of the electric screwdriver of the second embodiment.

FIG. 16 schematically shows the circuit configuration of the electric screwdriver 110. As shown in FIG. 16, a battery pack 100 connected with the connector 30 supplies electric power to the motor 14 and the control circuit 128. A semiconductor switch 80 is interposed in the circuit connecting the connector 30 and the battery pack 100. The semiconductor switch 80 is turned on and off by driving signals outputted from the control circuit 28.

The control circuit 128 comprises a microcomputer, a constant potential power source circuit, etc. The trigger switch 24, the detecting switch 52, and the indicator lights 126a, 126b, and 126c are connected with the control circuit 128. The control circuit 128 controls the operation of the semiconductor switch 80 and the indicator lights 126a, 126b, and 126c based on output signals from the trigger switch 24 and the detecting switch 52.

Figure 17:
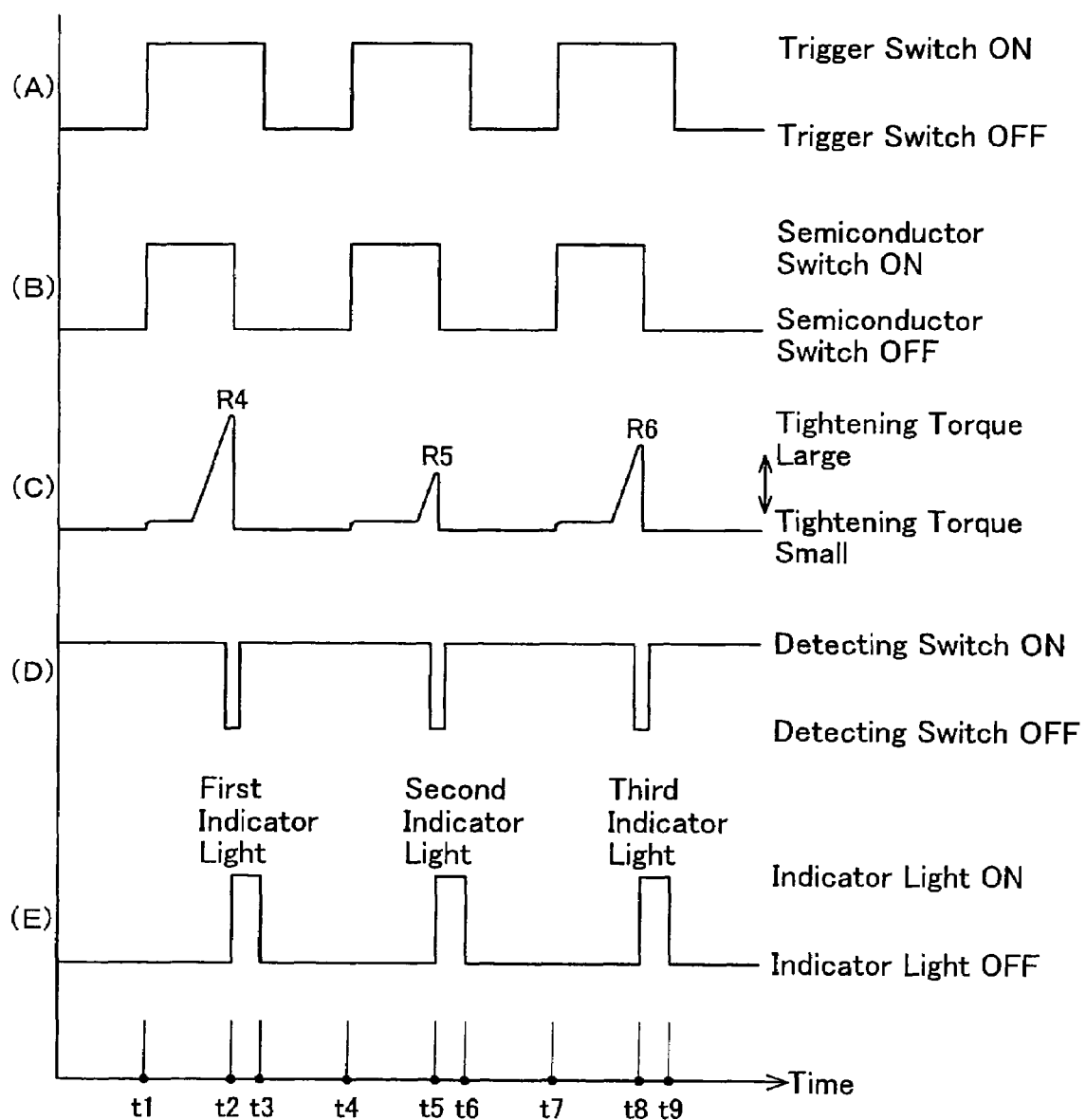
FIG. 17 shows a timing chart showing the flow of operations of the electric screwdriver of the second embodiment.

FIG. 17 shows a timing chart showing the operations, over time, of the components of the electric screwdriver 110. FIG. 17 shows a timing chart when three fasteners are tightened with differing torques sequentially each. In FIG. 17, (A) shows the on/off state of the trigger switch 24, (B) shows the on/off state of the semiconductor switch 80, and (C) shows reactive torque applied to the tool bit 18 from the fastener. This reactive torque is substantially equivalent to the tightening torque applied to the fastener by the tool bit 18. (D) shows the on/off state of the detecting switch 52, and (E) shows the on/off state of the indicator lights 126a, 126b, and 126c.

First, the user engages the tool bit 18 with a first fastener, and turns the trigger switch 24 on. This point is time t1. The motor 14 begins rotation. In the clutch 120, the first clutch member 56 and the second clutch member 158 are engaged by the first engaging portions 159a. The torque from the motor 14 is transmitted to the spindle 15, and tightening of the first fastener begins.

As shown in FIG. 17 (C), the first clutch member 56 and the second clutch member 158 are disengaged when the tightening torque applied to the first fastener reaches the first predetermined value R4 at time t2. As shown in FIG. 17 (D), the detecting switch 52 is turned off when the first clutch member 56 and the second clutch member 158 are disengaged. When the detecting switch 52 is turned off, the control circuit 128 turns the semiconductor switch 80 off. Simultaneously, the control circuit 128 turns the first indicator light 126a on. The user can thus learn from the first indicator light 126a being lit up that the tightening torque has reached the first predetermined value R4. When the user has noted that the first indicator light 126a has lit up, he turns the trigger switch 24 off at time t3. When the user turns the trigger switch 24 off, the control circuit 128 turns the first indicator light 126a off. The user can thus finish tightening the first fastener. The first fastener has been tightened with the tightening torque of the first predetermined value R4.

Next, the user engages the tool bit 18 with a second fastener, and turns the trigger switch 24 on. This point is time t4. The motor 14 again begins rotation. In the clutch 120, the first clutch member 56 and the second clutch member 158 are engaged by the second engaging portions 159b. The torque from the motor 14 is transmitted to the spindle 15, and tightening of the second fastener begins.

As shown in FIG. 17 (C), the first clutch member 56 and the second clutch member 158 are disengaged when the tightening torque applied to the second fastener reaches the second predetermined value R5 at time t5. As shown in FIG. 17 (D), the detecting switch 52 is turned off when the first clutch member 56 and the second clutch member 158 are disengaged. When the detecting switch 52 is turned off, the control circuit 128 turns the semiconductor switch 80 off. Simultaneously, the control circuit 128 turns the second indicator light 126b on. The user can thus learn from the second indicator light 126b being lit up that the tightening torque has reached the second predetermined value R5. When the user has noted that the second indicator light 126b has lit up, he turns the trigger switch 24 off at time t6. When the user turns the trigger switch 24 off, the control circuit 128 turns the second indicator light 126b off. The user can thus finish tightening the second fastener. The second fastener has been tightened with the tightening torque of the second predetermined value R5.

Next, the user engages the tool bit 18 with a third fastener, and turns the trigger switch 24 on. This point is time t7. The motor 14 again begins rotation. In the clutch 120, the first clutch member 56 and the second clutch member 158 are engaged by the third engaging portions 159c. The torque from the motor 14 is transmitted to the spindle 15, and tightening of the third fastener begins.

As shown in FIG. 17 (C), the first clutch member 56 and the second clutch member 158 are disengaged when the tightening torque applied to the third fastener reaches the third predetermined value R6 at time t8. As shown in FIG. 17 (D), the detecting switch 52 is turned off when the first clutch member 56 and the second clutch member 158 are disengaged. When the detecting switch 52 is turned off, the control circuit 128 turns the semiconductor switch 80 off. Simultaneously, the control circuit 128 turns the third indicator light 126c on. The user can thus learn from the third indicator light 126c being lit up that the tightening torque has reached the third predetermined value R6. When the user has noted that the third indicator light 126c has lit up, he turns the trigger switch 24 off at time t9. When the user turns the trigger switch 24 off, the control circuit 128 turns the third indicator light 126c off. The user can thus finish tightening the third fastener. The third fastener has been tightened with the tightening torque of the third predetermined value R6.

The user can thus tighten a plurality of fasteners with mutually differing torques sequentially each without performing an operation to adjust the clutch 120.

A second embodiment of the present invention has been described in detail above. However, the above is merely an example, and does not restrict the scope of the claims. The art set forth in the claims encompasses various transformations and modifications to the embodiment described above.

In the above embodiment, an example was described where the second clutch member 158 has three types of engaging portions 159a, 159b, and 159c. However, the second clutch member 158 may equally well be provided with only two types of engaging portions, or may have four or more types of engaging portions.

The engaging portions 159a, 159b and 159c may equally well have differing heights. In this case, when the first clutch member 56 and the second clutch member 158 are to be disengaged, the movement amount of the second clutch member 158 in the axial direction differs according to which of the engaging portions has caused the disengagement. It is possible to detect directly which of the engaging portions has caused the disengagement by observing the position of the second clutch member 158.

Instead of the indicator lights 126a, 126b, and 126c described in the embodiment, other informing devices may be utilized that, for example, generate sound, vibration, etc. The informing device is not restricted to informing only the user, but may equally well inform a controlling computer or the like by means of wireless communication.

The configuration of the first opposing face 56a of the first clutch member 56 and the configuration of the second opposing face 158a of the second clutch member 158 may equally well be the inverse of the above embodiment. That is, the engaging portions 159a, 159b and 159c may be formed on the first clutch member 56, and the contacting spheres 64 may be maintained on the second clutch member 158. In this case, the contacting spheres 64 and the second clutch member 158 may be molded integrally.

What is claimed is:

1. A tightening tool adapted to tighten a fastener, comprising:
    a motor;
    a spindle that transmits torque from the motor to a tool bit that can engage with the fastener;
    a pair of clutch members disposed between the motor and the spindle and comprising a first clutch member and a second clutch member that face each other, the first clutch member is connected to the motor, to be rotated by the motor and the second clutch member is connected to the spindle to rotate with the spindle; and
    a spring member that pushes at least one of the pair of clutch members towards the other, wherein:
    one of the pair of clutch members comprises a first engaging portion and a second engaging portion for engaging the pair of clutch members, the first engaging portion and the second engaging portion being formed on a surface that faces the other of the pair of clutch members and being separately arranged along a rotational direction of the pair of clutch members;
    the other of the pair of clutch members comprises a contacting portion for engaging the pair of clutch members formed on a surface that faces the one of the pair of clutch members, the contacting portion alternatively makes contact with the first engaging portion and the second engaging portion in accordance with rotation of the first clutch member with respect to the second clutch member;
    the first engaging portion comprises a gradient face with which the contacting portion makes contact to engage the pair of clutch members, the gradient face is angled such that the contacting portion passes over the gradient face to disengage the pair of clutch members when the torque applied to the tool bit is equal to or above a first predetermined value;
    the second engaging portion is located posterior to the first engaging portion in a direction toward which the contacting portion passes over the first engaging portion such that the contacting portion makes contact with the second engaging portion to engage the pair of clutch members after the first engaging portion has disengaged the pair of clutch members;
    the second engaging portion comprises a gradient face with which the contacting portion makes contact to engage the pair of clutch members, the gradient face is angled such that the contacting portion passes over the gradient face to disengage the pair of clutch members when the torque applied to the tool bit is equal to or above a second predetermined value; and
    the gradient face of the second engaging portion is angled at a different angle from the gradient face of the first engaging portion, and the second predetermined value is different from the first predetermined value.

2. A tightening tool as set forth in claim 1, wherein:
    the gradient face of the second engaging portion is angled steeper than the gradient face of the first engaging portion, and
    the second predetermined value is larger than the first predetermined value.

3. A tightening tool as set forth in claim 1, further comprising:
    a detecting switch disposed proximal to the pair of clutch members and adapted to detect disengagement of the pair of clutch members; and
    a motor controller coupled to the motor and the detecting switch, and constructed so as to control the motor in accordance with output signals of the detecting switch.

4. A tightening tool as set forth in claim 3, wherein:
    the motor controller counts a number of times the pair of clutch members is disengaged in accordance with the output signals of the detecting switch and ceases driving the motor when the counted number of times the pair of clutch members has been disengaged reaches a predetermined number of times.

5. A tightening tool as set forth in claim 3, wherein:
    the motor controller ceases driving the motor whenever the pair of clutch members is disengaged.

6. A tightening tool as set forth in claim 5, further comprising:
    an indicator coupled to the motor controller and comprising a first indicator light and a second indicator light, wherein
    the motor controller turns on the first indicator light when the first engaging portion disengages the pair of clutch members, and turns on the second indicator light when the second engaging portion disengages the pair of clutch members.

7. A tightening tool as set forth in claim 1, wherein:
    one of the pair of clutch members further comprises a third engaging portion for engaging the pair of clutch members, the third engaging portion being formed on the surface that faces the other of the pair of clutch members and being arranged in series with the first and second engaging portions along the rotational direction of the pair of clutch members;
    the third engaging portion is located posterior to the second engaging portion such that the contacting portion makes contact with the third engaging portion to engage the pair of clutch members after the second engaging portion disengages the pair of clutch members;

the third engaging portion comprises a gradient face with which the contacting portion makes contact to engage the pair of clutch members, the gradient face is angled such that the contacting portion passes over the gradient face to disengage the pair of clutch members when the torque applied to the tool bit is equal to or above a third predetermined value; and the gradient face of the third engaging portion is angled at a different angle from the gradient face of the second engaging portion and the third predetermined value is different from the second predetermined value.

8. A tightening tool as set forth in claim 7, wherein:

the gradient face of the second engaging portion is steeper than the gradient face of the first engaging portion and the second predetermined value is larger than the first predetermined value; and the gradient face of the third engaging portion is steeper than the gradient face of the second engaging portion and the third predetermined value is larger than the second predetermined value.

9. A tightening tool as set forth in claim 8, further comprising:

a detecting switch disposed proximal to the pair of clutch members and adapted to detect disengagement of the pair of clutch members; and a motor controller coupled to the motor and the detecting switch, and constructed so as to control the motor in accordance with output signals of the detecting switch, wherein the motor controller keeps driving the motor when the first or second engaging portion disengages the pair of clutch members, and ceases driving the motor when the third engaging portion disengages the pair of clutch members.

10. A tightening tool as set forth in claim 7, further comprising:

a detecting switch disposed proximal to the pair of clutch members and adapted to detect disengagement of the pair of clutch members; and a motor controller coupled to the motor and the detecting switch, and constructed so as to control the motor in accordance with output signals of the detecting switch, wherein the motor controller ceases driving the motor whenever the pair of clutch members is disengaged.

11. A tightening tool as set forth in claim 10, further comprising:

an indicator coupled to the motor controller and comprising a first indicator light, a second indicator light, and a third indicator light, and wherein the motor controller turns on the first indicator light when the first engaging portion disengages the pair of clutch members, turns on the second indicator light when the second engaging portion disengages the pair of clutch members, and turns on the third indicator light when the third engaging portion disengages the pair of clutch members.

\* \* \* \* \*